United States Patent [19]

Stageberg

[11] 4,255,218
[45] Mar. 10, 1981

[54] METHOD AND APPARATUS FOR APPLYING ADHESIVE STRIP

[75] Inventor: Wilfred E. Stageberg, St. Paul, Minn.

[73] Assignee: Minnesota Mining and Manufacturing Company, St. Paul, Minn.

[21] Appl. No.: 15,905

[22] Filed: Feb. 28, 1979

[51] Int. Cl.³ .............................................. B65C 9/20
[52] U.S. Cl. ................................. 156/238; 156/361; 156/344; 156/540; 156/584
[58] Field of Search ............... 156/584, 540, 522, 579, 156/581, 247, 248, 249, 344, 577, DIG. 37, 361, 238; 118/257, 76

[56] References Cited

U.S. PATENT DOCUMENTS

| | | | |
|---|---|---|---|
| 3,098,782 | 7/1963 | Powers | 156/540 |
| 3,539,419 | 11/1970 | Stageberg | 156/540 |
| 3,709,761 | 1/1973 | Trueb et al. | 156/579 |
| 3,992,244 | 11/1976 | Craig et al. | 156/584 |

Primary Examiner—Michael W. Ball

Attorney, Agent, or Firm—Cruzan Alexander; Donald M. Sell; William L. Huebsch

[57] ABSTRACT

A device for applying a portion of a strip of adhesive releasably carried on a liner to one surface of a member. The device comprises a platen of a firm material having an edge surface with a radius dimension of less than about ⅛ inch and a mechanism for pulling the liner along a predetermined path with a portion extending around the edge surface of the platen and with the surface of the liner opposite the strip of adhesive contacting the edge surface.

The surface of a member to which the strip of adhesive is to be applied is pressed against the strip of adhesive at the radiused edge surface and movement of the liner along the path will cause relative movement between the radiused edge surface and the surface of the member while transferring the strip of adhesive to the surface of the member and affording rotation of the member and resulting local deformation of the strip of adhesive at the edge surface so that the strip of adhesive can be applied in arcuate and linear patterns.

6 Claims, 3 Drawing Figures

METHOD AND APPARATUS FOR APPLYING ADHESIVE STRIP

Strips of pressure sensitive adhesive releasably carried on a liner (e.g., such as those commercially designated Scotch Brand Adhesive Transfer Tapes which are available from Minnesota Mining and Manufacturing Company of St. Paul, Minnesota) are useful for adhering two surfaces together by applying a portion of the strip of adhesive to one surface, stripping the liner away, and then adhering the other surface to the exposed surface of the adhesive. Various devices have been devised for applying such adhesive (e.g., the devices described in U.S. Pat. Nos. 3,765,992 and 3,969,181), the most pertinent to this application being that described in U.S. Pat. No. 3,969,181. That device is a manually activated applicator in which the liner on which the adhesive is supported is led around an application roller and then wound on a takeup reel. The application roller is manually rolled over a surface to which the adhesive is to be applied which causes adhesive on the liner passing around that roller to transfer to the surface and drives the windup mechanism to collect the liner. While the device works well for applying strips of adhesive in generally straight lines, it does not work so well for applying strips of adhesive in an arcuate pattern because the relatively long length of strip adhesive pressed between the application roller and surface and restricts any change in the direction of movement of the roller with respect to the surface.

BRIEF DESCRIPTION OF THE INVENTION

The present invention provides a device adapted to transfer a portion of a strip of adhesive to a surface from a releasable liner either in a straight line or in an arcuate pattern.

The device according to the present invention comprises means for defining an application station comprising a platen of a firm material having an edge surface radiused at less than about ⅛ inch, and a support member opposite the radiused edge surface. Means including two driven mating spur gears which receive the liner therebetween is provided for pulling the liner along a predetermined path with the surface of the liner opposite the strip of adhesive contacting the edge surface. The support member is adapted to be spaced from the radiused edge surface so that when a generally planar member is positioned between the radiused edge surface and the support member with its surface to which the adhesive is to be applied adjacent the radiused edge surface, movement of the liner along the path caused by rotation of the spur gears will move the generally planar member therebetween via contact between the strip of adhesive and the generally planar member while transferring the adhesive to its surface, and the narrow radiused edge surface pressing the adhesive against the surface will allow local deformation of the adhesive strip at the edge surface so that the planar member can be pivoted beneath the radiused edge surface in a plane parallel to the radiused edge surface and the adhesive can be applied in an arcuate as well as in a linear pattern.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
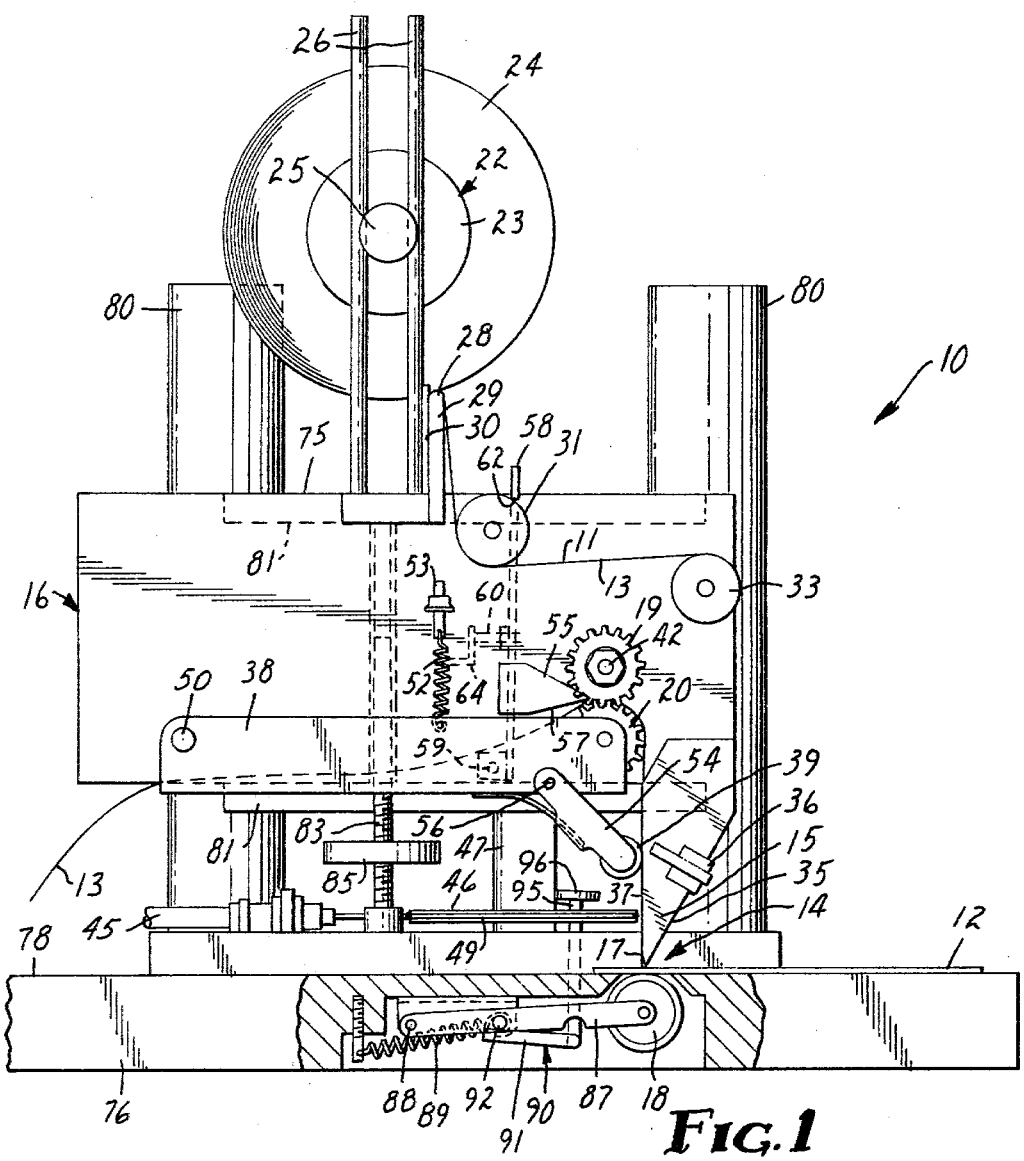
FIG. 1 is an elevational side view of an adhesive applying device according to the present invention having parts broken away to show details.

Referring now to the drawing there is shown a device 10 according to the present invention which is adapted for applying portions of a strip of adhesive 11 to a surface on generally planar member 12 from a liner 13 on which the strip of adhesive 11 is releasably supported.

Figure 2:
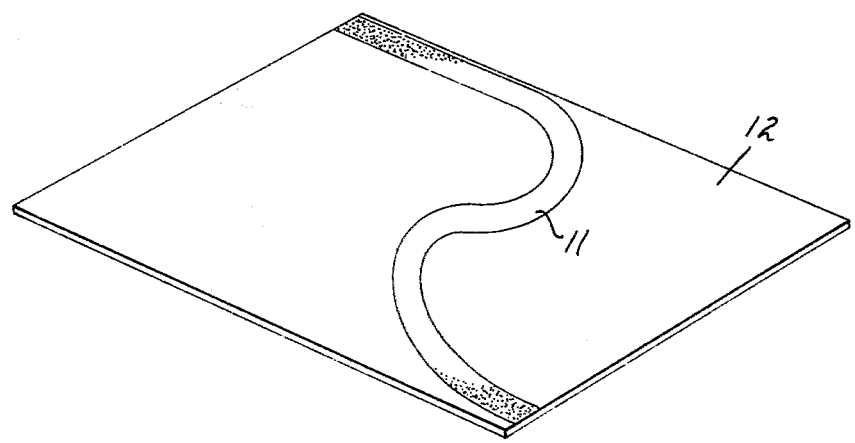
FIG. 2 is a perspective view of a generally planar member to which a strip of adhesive has been applied by the device of FIG. 1.
Figure 3:
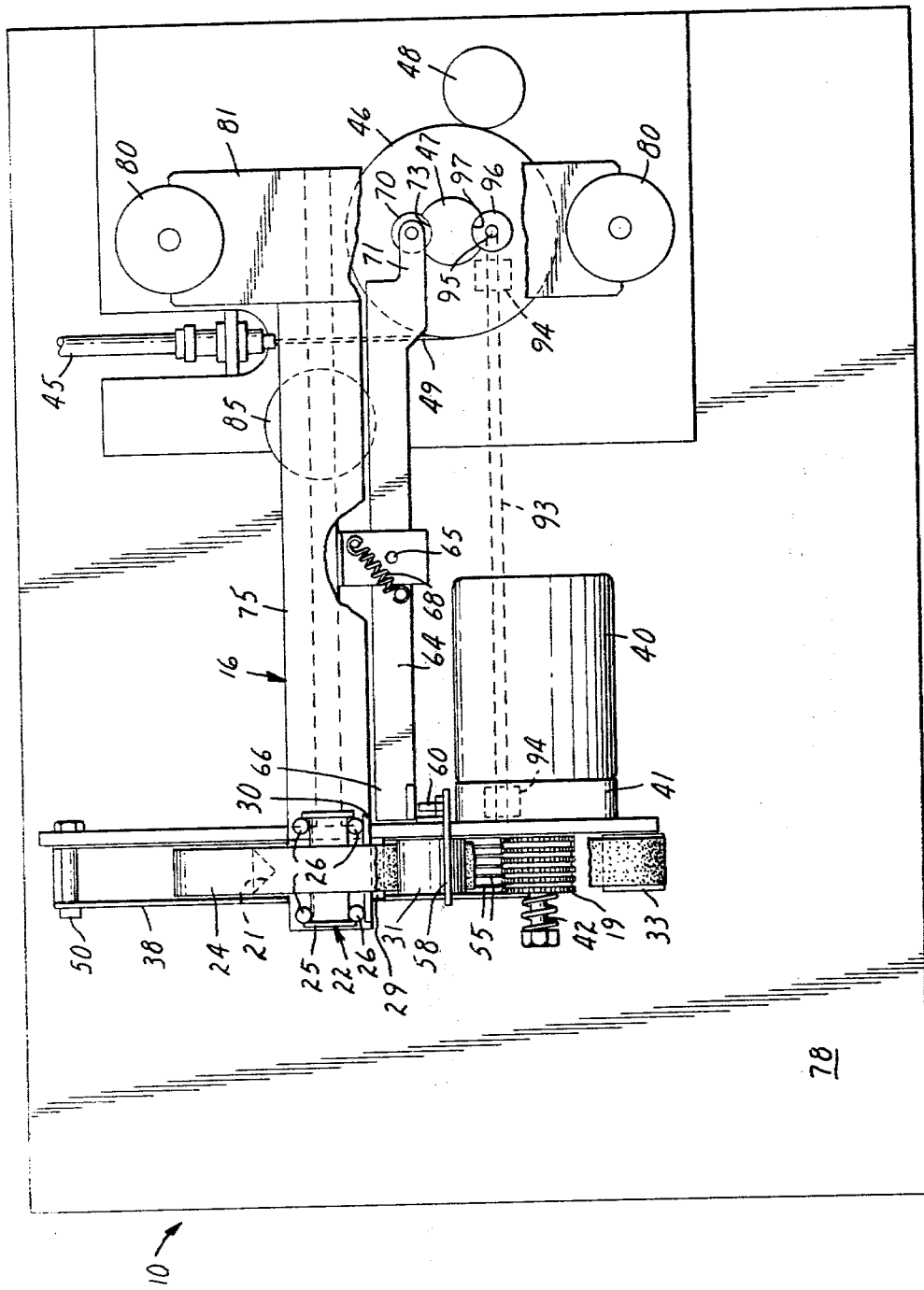
FIG. 3 is a horizontal plan view of the device shown in FIG. 1 which has parts broken away to show details.

The device 10 includes means for defining an application station 14 comprising a platen 15 of a firm material (e.g., steel) fixed on a frame 16 for the device 10, and having a straight edge surface 17 radiused at less than about ⅛ inch radius (preferably at about a 1/16 inch radius), and a support member or roller 18 mounted opposite the radiused edge surface 17. Means in the form of two driven meshed spur gears 19 and 20 engaging the liner 13 in a nip therebetween are provided for pulling the liner 13 along a predetermined path including a path portion extending around the radiused edge surface 17 with the surface of the liner 13 opposite the strip of adhesive 11 contacting the radiused edge surface 17 and the radiused edge surface 17 disposed transverse of the liner 13 at a right angle to its edges. When the generally planar member 12 is positioned between the radiused edge surface 17 and the support member 18 with the surface of the generally planar member to which the strip of adhesive 11 is to be applied adjacent the platen 15, movement of the liner 13 along the path via rotation of the gears 19 and 20 will move the generally planar member 12 therebetween via engagement between the strip of adhesive 11 and the generally planar member 12 and will transfer the strip of adhesive 11 to its surface while affording local deformation of the narrow transverse band of the strip of adhesive 11 at the radiused edge surface 17 to allow pivoting of the generally planar member 12 under the platen 14 so that the adhesive can easily be applied to its surface in other than a linear pattern; such as in the generally S-shaped pattern illustrated in FIG. 2.

As is best seen in FIG. 1, the path for the liner 13 and strip of adhesive 11 releasably supported thereon is defined by a hub 22 including a circular central portion 23 having a V-shaped periphery 21 (FIG. 2) which axially centers a supply roll 24 of the liner 13 and strip adhesive 11 about the central portion 23. Also included in the hub 22 are two outwardly projecting knobs 25 co-axial with its central portion 23, each of which knobs 25 is retained between two upwardly projecting rods 26 on each side of the central portion 23. The rods 26 provide means for allowing vertical movement of the supply roll 24 so that it will rest on the upper edge 28 of a stripping plate 29 with its outermost coils between surfaces defining a slot in a guide plate 30 adjacent the stripping plate, which guide plate 30 surfaces provide means for centering the outermost coils on the supply roll along the upper edge 28. The upper edge 28 of the stripping plate 29 has a small radius (e.g., ⅛ inch radius) and is spaced from beneath the center of the supply roll 24 so that the liner 13 and strip of adhesive 11 passes around the edge 28 in an arc. This insures that the strip of adhesive 11 will peel away from the adjacent back surface of the portion of the liner 13 wrapped around the supply roll 24 with the portion of the liner 13 on which the strip of adhesive 11 is releasably adhered.

From the stripping plate 29 the liner 13 and strip of adhesive 11 extend around the surface of an idler roller 31 with the strip of adhesive 11 contacting its peripheral surface which is defined by a material (e.g., silicone rubber) which allows the strip of adhesive 11 to separate cleanly therefrom, around an idler roller 33 rotatably mounted on the frame 16, along a first surface 35 of the platen 15, through a slot in an edge guide block 36 removably mounted thereon, around the radiused edge surface 17 where the strip of adhesive 11 is transferred, along a second surface 37 of the platen 15 disposed at an acute angle of about 30 degrees with the first surface 35, past an adhesive pick-off roller 39 the function of which will be later explained, and to the nip between the spur gears 19 and 20. From the spur gears 19 and 20 the liner 13 passes through a passage defined in a generally U-shaped channel 38 in which the gear 20 is rotatably mounted, and exits the device 10.

In addition to the gears 19 and 20, the means for pulling the liner 13 along the path comprises means for driving the gears 19 and 20 at a desired speed, and means for biasing the teeth of the gears 19 and 20 together so that they will firmly engage the liner 13 therebetween. A variable speed motor 40 is coupled through a gear box 41 mounted on the frame to an output shaft 42 on which the spur gear 19 is fixed. The motor 40 can be activated via a foot pedal (not shown) which via a cable 49 slideable through a sheath 45 can rotate a control gear 46 fixed to a shaft 47 rotatably mounted on the frame 16 to which control gear 46 the cable 49 is attached, and a gear 48 meshed with the control gear 46 and fixed to a shaft of a speed controller which electrically controls the speed of the motor 40.

The means for biasing the spur gears 19 and 20 into engagement with the liner 13 are provided by mounting the end of the U-shaped channel 38 opposite the gear 20 on the frame 16 for pivotal movement about a pin 50, and by tensioning a spring 52 between the channel 38 and a bolt 53 adjustably supported on the frame 16.

The adhesive pick off roller 39 is made of a material to which the strip of adhesive 11 will adhere in preference to the liner 13 (e.g., "Delrin") and is provided to insure that any portions of the strip of adhesive 11 that do not transfer at the radiused edge surface 17 will be collected on the surface of the pick-off roller 39, and will not be carried into the gears 19 and 20. The adhesive pick-off roller is rotatably mounted at one end of a bracket 54 which has its other end pivotably mounted on the channel 38, and is biased against the liner 13 along the second surface 37 by a leaf spring 56 between the bracket 54 and the channel 38.

Means are provided for insuring that the stresses caused in the liner 13 by pulling it around the radiused edge surface 17 in opposition to the means for restricting its movement (including the force required to peel the strip of adhesive 11 and liner 13 from the supply roll 24 and to peel the strip of adhesive 11 from the idler roller 31) will not cause the liner 13 to coil around the gear 19 and re-enter the nip between the gears 19 and 20. The gears 19 and 20 have a plurality of axially spaced circumferential grooves, and a plurality of similarly spaced blades 55 having pointed ends are fixed to the frame 16 with their pointed ends in the grooves around the gear 19. The liner passes the edge surfaces 57 of the blades 55 adjacent the gear 20, which edge surfaces 57 prevent the liner from coiling around the gear 19.

Means are provided for preventing the movement of the liner 13 and strip of adhesive along the path past the platen 15 when the motor 40 is deactivated so that movement of the generally planar member 12 relative to the radiused edge surface 17 by the operator when the motor is deactivated will cause the strip of adhesive to break cleanly along the radiused edge surface 17.

A generally L-shaped arm 58 is mounted on the frame 16 for pivotal movement around a pin 59 between an engage position to which the arm 58 is biased by a spring 60 and at which an inner edge 62 of the arm 58 will engage and stop rotation of the roller 31; and a release position with the edge 62 of the arm 58 spaced from the roller 31 to permit free rotation of the roller 31. A pivot bar 64 is pivotably mounted on the frame by a pin 65 for pivotal motion between a release position at which a first end 66 of the pivot bar 64 will contact and move the L-shaped arm 58 to its release position, and a latch portion with the end 66 of the pivot bar 64 spaced from the L-shaped arm 58 to which latch position the pivot bar is biased by a spring 68 between the frame 16 and pivot bar 64. A roller 70 is rotatably mounted on the second end 71 of the pivot bar 64 and is adapted to enter an arcuate axially extending groove 73 in the shaft 47 on which the central gear 46 is fixed, which groove 73 is aligned with the roller 70 when the central gear 46 positions the speed controller in its off position so that the spring 68 can position the pivot bar 64 in its latch position and the spring 60 can move the L-shaped arm 58 to its engage position. Upon rotation of the central gear and shaft 47 via the foot pedal to start the motor 40, a convex surface portion of the shaft 47 will move adjacent the roller 70 to pivot the pivot bar 64 and thereby the L-shaped arm 58 to their release positions at which the roller 31 can be rotated as the liner 13 is pulled along the path.

The radiused edge surface 17 of the platen 15 is adapted to be spaced at different distances from the support roller 18 to receive generally planar members 12 of various thicknesses therebetween, and means are provided for raising the support roller 18 when the motor 40 is activated to press a generally planar member 12 overlaying the support roller 18 into contact with the radiused edge 17, and for lowering the support roller 18 a short distance when the motor 40 is deactivated to facilitate removing or inserting generally planar member between the platen 15 and support roller 18.

The frame 16 includes a cantilevered movable portion 75 on the distal end of which the platen 15 and means defining the path for the liner 13 and strip of adhesive 11 are mounted; and a base portion 76 including a base block having a planar upper surface 78 over which a generally planar member 12 to which strip adhesive is to be applied may be guided, and two upwardly projecting cylindrical pillars 80. The end of the cantilevered movable portion 75 opposite the platen 15 has two vertically spaced, horizontally disposed plates 81 having opposite concave end surfaces engaged the opposed surfaces of the pillars 80 to mount the movable portion 75 on the base portion 76 for vertical movement. A threaded shaft 83 having one end rotatably mounted on the base portion 76 and fixed against axial movement relative thereto has its opposite end threadably engaged with the movable portion 75 so that rotation of a knurled adjusting wheel 85 fixed to the shaft 83 will cause vertical movement of the cantilevered portion 75 to provide a desired spacing between the radiused edge surface 17 of the platen 15 and the support roller 18.

The means for raising and lowering the support roller 18 includes a bracket 87 rotatably supporting the support roller 18 at one end and being pivotably mounted about a pin 88 at its end opposite the support roller 18 to affort movement of the support roller 18 between its raised or press position and its lowered or spaced position to which lowered position it is biased by a spring 89 tensioned between the base portion 76 and a lug 92 fixed to the bracket 87. Also included is a rod 90 having a first end portion 91 disposed against the lower side of the lug 92 a central portion 93 disposed at a right angle to the first end portion 91 and rotatably mounted in bearings 94 on the base portion 76, and a second end portion 95 disposed at about a right angle to both the first end portion 91 and the central portion 93 and having a roller 96 rotatably mounted about its distal end. The roller 96 is adapted to enter an arcuate axially extending groove 97 in the shaft 47 on which the control gear 46 is fixed, which groove 97 is aligned with the roller 96 when the central gear 46 positions the speed controller in its off position in which the first end portion 91 is positioned to allow the support roller 18 to move to its lower position under the influence of the spring 89. Upon rotation of the central gear 46 and shaft 47 via the foot pedal to start the motor 40, a convex surface portion of the shaft 47 will move adjacent the roller 96 to pivot the rod 96 and thereby the bracket 87 via contact between the first portion of the rod 91 and the lug 92 on the bracket 87 to move the support roller 18 to its raised position.

Operation

To operate the device 10 an operator first inserts a planar member 12 to which a portion of the strip of adhesive 11 is to be applied between the support roller 18 and the radiused edge surface 17 on the platen 15, and then activates the device 10 by pressing the foot pedal (not shown). Such activation rotates the central gear 46, which rotates the gear 48 on the speed controller to start the motor 40, and moves arcuate portions of the shaft 47 adjacent the rollers 96 and 70 so that via the pivot bar 64 the L-shaped arm 58 is moved out of engagement with the brake roller 31 to permit its rotation, and via the rod 90 the support roller 18 is moved through the opening in the surface 78 and presses the planar member 12 against the strip of adhesive 11 at the radiused edge surface 17 of the platen 15.

The activated motor 40 then rotates the gears 19 and 20 which engage the liner 13 therebetween and pull it along the path in opposition to the forces required to unwrap and move the strip and adhesive 11 and liner 13 so that the liner 13 is tensioned around the radiused edge surface 17. At the radiused edge surface 17 the strip of adhesive 11 engages the adjacent surface of the planar member 12 causing it to move between the radiused edge surface 17 and the support member 18 as the liner 13 is driven along its path and the strip of adhesive 18 transfers to planar member 12. If the operator wishes, he may pivot the planar member 12 relative to the radiused edge surface 17 which will cause portions of the strip of adhesive 11 at the edge surface 17 to deform during transfer so that the strip of adhesive 11 may be applied to the planar member in a pattern including arcuate portions.

When a sufficient portion of the strip of adhesive 11 has been applied, the operator removes pressure from the foot pedal, which via rotation of the control gear 46 and the gear 48 and resultant movement of the rollers 70 and 96 into the notches 73 and 97 causes the L-shaped arm 58 to again engage and stop rotation of the brake roller 31 and the support roller 18 to move to its release position further spaced from the radiused edge surface 17 of the platen 15. Movement of the planar member 12 by the operator will then cause the strip of adhesive 11 to break at the radiused ege surface 17 of the platen 15, and the planar member 12 can be removed from the device 10.

It will be appreciated that many changes could be made in the device 10 described herein without departing from the spirit of the invention. For example, the device can be used to apply two parallel strips of adhesive by mounting two supply rollers on the hub 23 with a spacer therebetween, and by providing an appropriately shaped guide plate 30 and guide block 36. The principles of the device 10 can be used to apply a strip of adhesive to almost any continuous surface by providing an appropriate means for pressing the surface against the adhesive at the radiused edge surface 17 and for affording relative movement between the radiused edge surface 17 and the surface of the member as the adhesive is applied. Also, as in the device described in U.S. Pat. No. 3,969,181, such relative movement may provide part or all of means for pulling the liner along the path past the radiused edge surface. Thus the scope of the invention should not be limited to the structure described herein, but only by the language of the dependent claims and its equivalents.

I claim:

1. A method for applying a portion of a strip of adhesive releasably carried on a liner to one surface of a member in an arcuate pattern, said method comprising:

providing a platen of a firm material having an edge surface with a radius dimension of less than about $\frac{1}{8}$ inch;

pulling the liner along a predetermined path with a portion extending around the edge surface with the edge surface transverse of the liner and with the surface of the liner opposite the strip of adhesive contacting the edge surface;

pressing the surface of the member against the strip of adhesive at the radiused edge surface so that movement of the liner along said path will cause relative movement between the radiused edge surface and the surface of the member while transferring the adhesive to the surface of the member; and pivoting the member in a plane generally parallel to the edge surface to cause local deformation of said adhesive strip at the edge surface so that said strip of adhesive will be applied in the arcuate pattern.

2. A device for applying a portion of a strip of adhesive releasably carried on a liner to one surface of a generally planar member in arcuate and linear patterns, said device comprising:

means for defining an application station comprising a platen of a firm material having an edge surface with a radius dimension of less than about $\frac{1}{8}$ inch; and a support member opposite said radiused edge surface; and means for pulling a said liner along a predetermined path with a portion extending around said edge surface with the edge surface transverse of the liner and with the surface of the liner opposite the strip of adhesive contacting the edge surface;

said support member being adapted to be spaced from said radiused edge surface so that with said generally planar member positioned between said radiused edge surface and said support member with its one surface adjacent said radiused edge surface, movement of said liner along said path by said means for pulling will move said generally planar member therebetween while transferring said adhesive thereto and affording pivoting of the generally planar member in a plane generally parallel to said edge surface and resulting local deformation of said adhesive strip at the edge surface so that said strip of adhesive can be applied to the planar member in arcuate and linear patterns.

3. A device according to claim 2 wherein said edge surface has a radius dimension of about 1/16 inch.

4. A device according to claim 2 wherein said means for pulling said liner comprises a pair of gears having meshing teeth engaging opposite sides of said liner, and means for driving said gears adapted to be selectively activated and deactivated, and said device includes means along the path in advance of said edge surface to prevent movement of said liner along said path past said edge surface under the influence of tension applied to said liner at said edge surface when said means for driving is deactivated.

5. A device according to claim 2 wherein said support member is mounted for movement between a press position spaced a predetermined distance from said radiused edge surface to press a said generally planar member into engagement with strip adhesive at said radiused edge surface and a spaced position spaced further from said radiused edge surface than when said support member is in its press position to affort inserting or removing a said planar member therebetween; said means for pulling said liner is adapted to be selectively activated and deactivated, and said device includes means for moving said support member from its spaced to its press position when said means for pulling said liner is activated and for moving said support member from its press to its release position when said means for pulling said liner is de-activated.

6. A device according to claim 4 wherein said device includes means along said path in advance of said edge surface for stoping movement of said liner along said path past said edge surface when said means for pulling said liner is deactivated.

* * * * *